United States Patent
Tuttle

[11] 3,888,439
[45] June 10, 1975

[54] CONDUIT HANGER ASSEMBLY FOR AUTOMOTIVE AND SIMILAR USES

[75] Inventor: Thomas J. Tuttle, Cavanaugh Lake, Chelsea, Mich.

[73] Assignee: Rockwell International Corporation, Pittsburgh, Pa.

[22] Filed: Mar. 30, 1972

[21] Appl. No.: 239,691

[52] U.S. Cl............... 248/54 R; 180/64 A; 248/62; 248/74 A
[51] Int. Cl.² ......................................... F16L 3/02
[58] Field of Search ..... 248/58, 62, 63, 74 A, 74 R, 248/228, 316, 54 R, 50, 317, 49; 180/64 A

[56] References Cited
UNITED STATES PATENTS

| 624,484 | 5/1899 | Haskell | 248/74 R |
|---|---|---|---|
| 768,122 | 8/1904 | Hamilton | 248/316 D |
| 1,262,763 | 4/1918 | Farley | 248/62 |
| 1,707,557 | 4/1929 | Leap | 248/230 |
| 2,160,808 | 6/1939 | Bradley | 248/54 R X |
| 2,369,978 | 2/1945 | Papalexis et al. | 248/316 D |
| 2,378,660 | 6/1945 | Roux | 248/229 |
| 2,636,703 | 4/1953 | Wallans | 248/58 |
| 2,842,218 | 7/1958 | Bradbury | 248/54 R X |
| 3,161,252 | 12/1964 | Brown | 180/64 A |

FOREIGN PATENTS OR APPLICATIONS

| 490,789 | 5/1919 | France | 248/317 |
|---|---|---|---|
| 606,082 | 8/1948 | United Kingdom | 248/228 |
| 949,372 | 9/1956 | Germany | 248/316 D |
| 42,912 | 11/1865 | Germany | 248/62 |
| 946,773 | 7/1956 | Germany | 180/64 A |

*Primary Examiner*—Roy D. Frazier
*Assistant Examiner*—Rodney H. Bonck

[57] ABSTRACT

A simply constructed inexpensively manufactured hanger assembly for exhaust system components of automotive vehicles such as exhaust pipes and mufflers and for similar conduits, which is preferably angularly adjustable, and which is effective to provide both thermal and vibrational isolation of the conduit from its support.

4 Claims, 2 Drawing Figures

PATENTED JUN 10 1975    SHEET  1    3,888,439
Fig.1.
Fig.2.
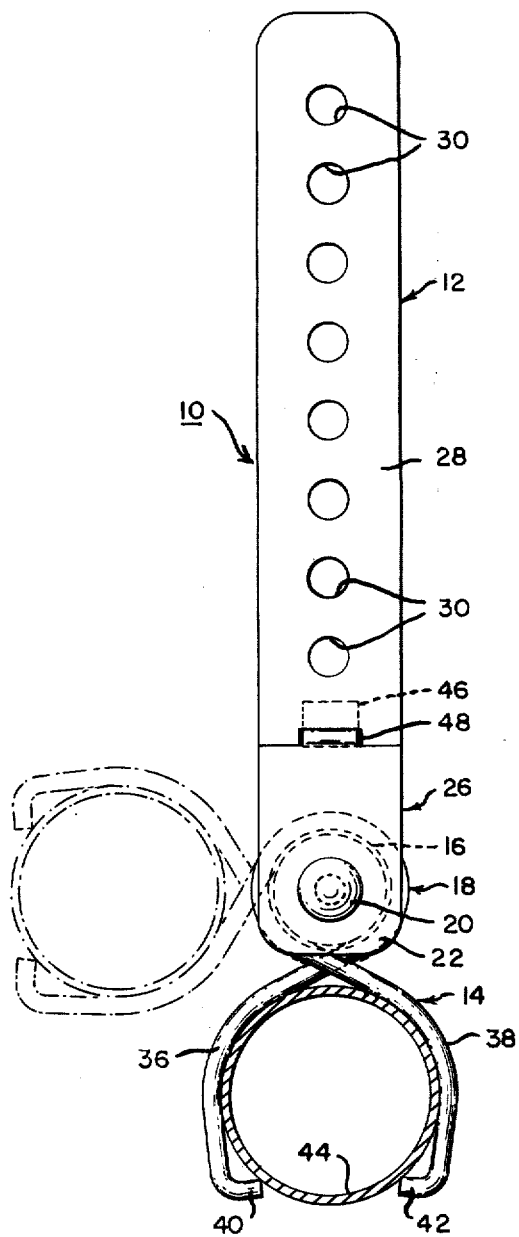
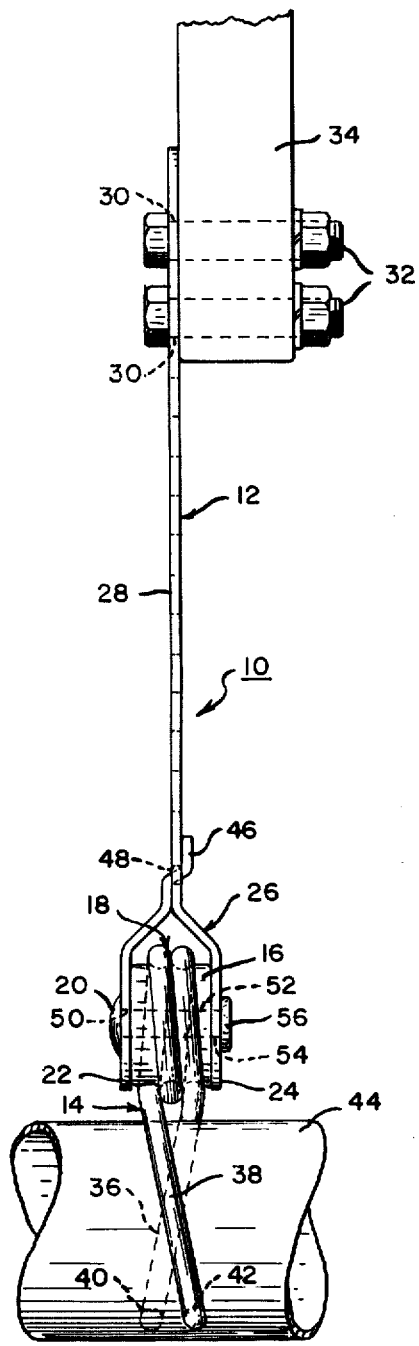

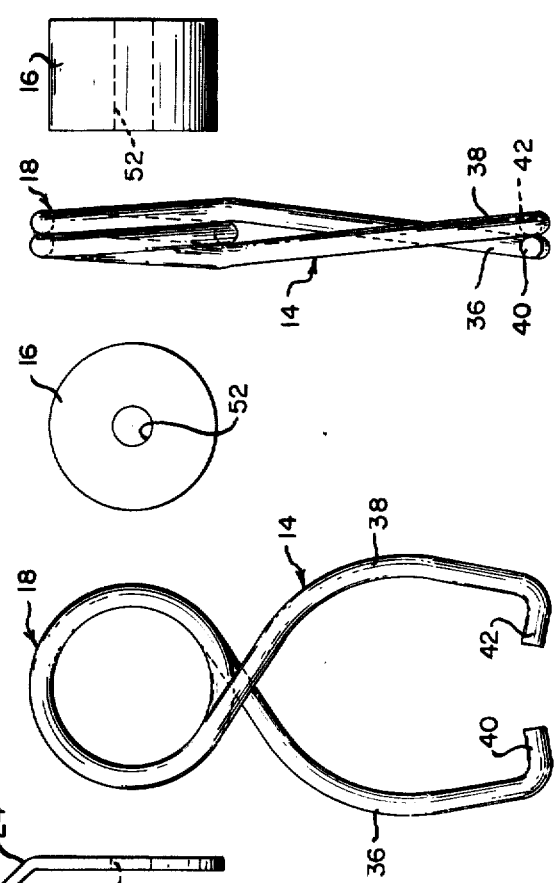
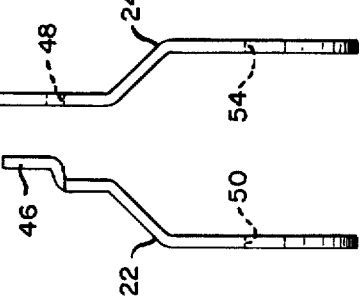
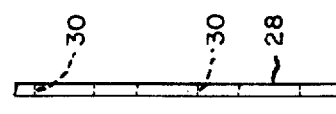
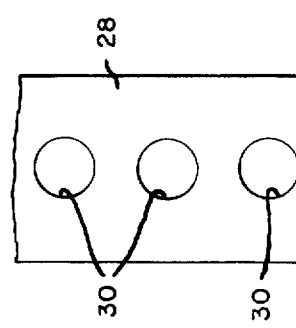
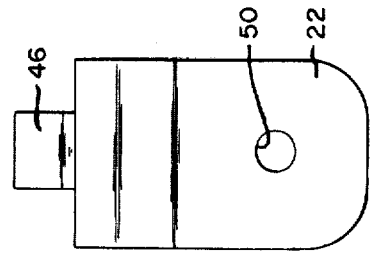

CONDUIT HANGER ASSEMBLY FOR AUTOMOTIVE AND SIMILAR USES

BACKGROUND OF INVENTION

Hangers for conduits have taken a variety of forms in the past. Typical examples will be found in U.S. Pat. No. 316,922 issued Apr. 28, 1885 to H. Trask for "Pipe Hanger", U.S. Pat. No. 447,297 issued Mar. 3, 1891 to R. C. Carpenter for "Pipe Hanger", U.S. Pat. No. 947,441 issued Jan. 25, 1910 to R. Hankin et al for "Beam Clamp and Hanger", and U.S. Pat. No. 1,255,219 issued Feb. 5, 1918 to C. A. Pedersen for "Stovepipe Hanger".

Recently it has been proposed to use as a conduit hanger a coil type torsion spring having extensions from each end shaped similarly to and coacting in the general manner of slightly open tongs, the tips of the opposed tongs being spaced apart so that the conduit may be inserted between the tongs by pressure forcing the tongs apart. Once the conduit is fully seated between the tongs, the torsion spring causes the tongs to contract and firmly grip the conduit. The tips of the tongs are inwardly turned to firmly grip the conduit to prevent its inadvertent disengagement from the torsion spring hanger tong. This has proved to be a very reliable and economical device for holding exhaust pipes, mufflers and similar conduits of automotive vehicles.

As heretofore constructed such devices have, despite their merits, not been generally accepted. As heretofore constructed the heat of the conduit supported by the tongs is transmitted to the vehicle structure on which the tongs are mounted. Similarly, vibration of a conduit is also transmitted through the hanger having a torsion spring hanger tong to the support and the vehicle body. Neither result is acceptable from the vehicle passenger's viewpoint.

The present invention overcomes these disadvantages of the torsion spring hanger tongs as previously constructed by providing an improved support in which the torsion spring is completely isolated both thermally and vibrationally from the strap of the hanger assembly so that neither noise nor heat can be transmitted from the conduit to its support.

More specifically, this result is achieved simply and economically by relatively few interfitting parts which can be finally assembled by but a single fastening device, such as a rivet.

An additional feature of this invention is that the hanger tongs are angularly adjustable relative to the strap before the conduit is in place between the tongs but which is firmly retained in its selected angular position while the conduit is being inserted in the hanger and after it has been so inserted.

DESCRIPTION OF DRAWINGS

FIG. 1 is a plan view of the hanger tong assembly of the present invention showing the manner in which it supports a conduit such as an exhaust pipe;

FIG. 2 is a side elevational view of the structure of FIG. 1;

FIG. 3 is a plan view of one of the arms of the yoke portion of the strap;

FIG. 4 is a plan view of the other yoke portion of the strap;

FIG. 5 is a side view of the yoke arm shown in FIG. 3;

FIG. 6 is a side view of the strap and other yoke arm as shown in FIG. 4;

FIG. 7 is a plan view of the torsion spring hanger tongs;

FIG. 8 is an end view of the grommet which fits within the coil of the tongs of FIG. 7;

FIG. 9 is a side view of the tongs of FIG. 7;

FIG. 10 is a side view of the grommet of FIG. 8.

DESCRIPTION OF INVENTION

Referring now in detail to the drawings, the hanger assembly 10 of the present invention comprises a strap 12, a torsion spring hanger tong 14, a grommet 16 of elastomeric material received within the coil 18 of the hanger tong 14 and a fastener rivet 20 extending through the bore of the annular grommet 16 and the spaced arms 22 and 24 of the yoke portion 26 of the strap 12.

The upper portion 28 of the strap 12 is provided with a plurality of through apertures 30 through which may be inserted bolts 32 to secure the strap upper portion 28 to a suitable support 34 as is most clearly illustrated in FIG. 2.

The depending arms 36 and 38 of the hanger tongs 14 are formed at their lower ends with inwardly turned opposed tips 40 and 42, respectively, forming teeth as shown in FIG. 1.

In use, the conduit 44 to be supported is forced between the tips 40 and 42 of the arms 36 and 38 causing the arms to expand and permit insertion of the conduit 44 to the position shown in FIGS. 1 and 2. In that position the arms 36 and 38 resiliently contract under the influence of the coil 18 acting as a torsion spring to firmly grip the conduit 44 as illustrated in FIGS. 1 and 2, the teeth 40 and 42 engaging the bottom of the conduit 44 to prevent its inadvertent disengagement from the arms 36 and 38 as due to vibration.

Referring now to FIGS. 7 through 10, inclusive, the tongs 14 are so formed that contraction of the arms 36 and 38 toward each other will increase the internal diameter of the coil portion 18 and separation of the arms 36 and 38 will cause contraction of the internal diameter of the coil 18. In the normal unstressed condition of the hanger tong 14, as shown in FIGS. 7 and 9, the internal diameter of the coil portion 18 is slightly (0.090 inch for example) less than the outside diameter of the grommet 16. The grommet 16 is placed within the coil 18 in the position shown in FIGS. 1 and 2 by expanding the internal diameter of the coil 18 as just described, inserting the grommet 16, and allowing the coil 18 to return to its unstressed condition as shown in FIGS. 7 and 9. In this position there is a light interference fit between the grommet 16 and the internal surface of the coil 18 inhibiting relative rotation therebetween.

The structure of the hanger strap 12 is best illustrated in FIGS. 3 through 6, inclusive. As is shown in FIGS. 4 and 6, the upper portion 28 of the strap and the yoke arm 24 are formed by a single metal stamping, the arm 24 being laterally offset from the upper portion 28. The yoke arm 22 is provided by a separate piece, also a metal stamping, and has at its upper end a projecting tongue 46 laterally offset from the arm 22 and adapted to fit through a through-slot 48 in the upper portion 28 of the strap 12, as is most clearly shown in FIGS. 1 and 2.

With continued reference to FIGS. 1 and 2, it is now apparent that assembly of the hanger assembly 10 is effected by inserting the tongue 46 through the slot 48, placing the coil 18 of the hanger tongs 14 with the grommet 16 therein between the arms 22 and 24 of the yoke portion 26 of the strap 12, inserting the rivet 20 through the aligned apertures 50, 52 and 54 of the arm 22, grommet 16 and arm 24, respectively, and thereafter upsetting the projecting end of the rivet 20 to form an opposed head as indicated at 56.

In this final assembly the grommet 16 is axially compressed between the arms 22 and 24 of the yoke 26 and is firmly frictionally retained therebetween and against the rivet 20 so that the grommet 16 cannot rotate relative to the arms 22 and 24. Angular adjustment of the tongs 14 relative to the strap 12 is still possible by contracting the arms 36 and 38 of the tongs 14 to expand the internal diameter of the coil 18 to reduce the frictional engagement between the coil 18 and the grommet 16 and, when the tongs 14 are in their desired relative angular position with reference to the strap 12 such as the position shown in phantom in FIG. 1, releasing the arms 36 and 38 to their unstressed position.

As is apparent from FIG. 1, insertion of the conduit 44 into the tongs 14 expands the arms 36 and 38 causing the coil 18 to more tightly contract about the grommet 16 and thereby immobilize the tongs 14 relative to the strap 12.

The grommet 16 in the structure of the present invention completely isolates the tongs 14 from metal to metal contact with the rivet 20, and any portion of the strap 12. It thus precludes transmission of vibration from the conduit 44 to the strap 12 and the support 34 and similarly precludes transmission of heat from the conduit 44 through the hanger tongs 14 to the strap 12 and the support 34. This is extremely important in automotive application where the hanger assembly 10 of the present invention is used to support the engine exhaust pipes, the muffler, and other components of the exhaust system. To support a muffler, a pair of the hanger assemblies 10 are provided, one at each end of the muffler, the tongs 14 of these two assemblies gripping the projecting generally cylindrical inlet and outlet extensions at opposite ends of the muffler.

What is claimed is:

1. A conduit hanger assembly for automotive exhaust system components and the like including elongate fastening means adapted adjacent one end to be secured to a support structure, an annular elastomeric member, connecting means securing said elastomeric member to the other end of said fastening means, and a spring hanger comprising a torsion spring having a coil body and arms which are integral extensions of the opposite ends of the coil ends which form spaced apart tong arms between which an exhaust system component can be inserted to expand and be gripped by the tong arms, the coil body of said hanger being positioned about the periphery of said elastomeric member in frictional engagement therewith, the internal diameter of said coil body in an unstressed condition being less than the outside diameter of said elastomeric member whereby, by contraction of said tong arms forming spring extensions the frictional engagement between said coil and said elastomeric member can be reduced sufficiently to permit relative angular adjustment between said elastomeric member and said hanger and whereby expansion of the coil tong arm causes contraction of said coil into tighter immobilizing frictional engagement with said elastomeric member.

2. The conduit hanger of claim 1 wherein said connecting means extends through the body of said elastomeric member and said connecting means, elastomeric member and spring hanger coil body are concentrically oriented.

3. The conduit hanger of claim 1 wherein said fastening means includes a yoke between the arms of which said elastomeric member is compressed and upon which said elastomeric member is fixed by said connecting means supported at its opposite ends by the yoke arms and extending through the elastomeric member.

4. A conduit hanger assembly for automotive exhaust system components and the like including elongate fastening means adapted adjacent one end to be secured to a support structure to position said fastening means such that its longitudinal axis lies substantially vertically, an annular elastomeric member, connecting means securing said elastomeric member to the other end of said fastening means, and a spring hanger comprising a torsion spring having a coil body and arms which are integral extensions of the opposite ends of the coil ends which form spaced apart tong arms between which an exhaust system component can be inserted to expand and be gripped by the tong arms, the coil body of said hanger being positioned about the periphery of said elastomeric member in frictional engagement therewith, the internal diameter of said coil body in an unstressed condition being less than the outside diameter of said elastomeric member whereby, by contraction of said tong arms forming spring extensions the frictional engagement between said coil and said elastomeric member can be reduced sufficiently to permit relative angular adjustment between said elastomeric member and said hanger by pivotally swinging said hanger about said elastomeric member such that an exhaust component gripped by said arms will be laterally offset relative to said vertical axis and whereby expansion of the coil tong arm causes contraction of said coil into tighter immobilizing frictional engagement with said elastomeric member and the holding of said exhaust component against the force of gravity laterally offset from said vertical axis.

* * * * *